United States Patent [19]
Kemme-Kroonsberg et al.

[11] Patent Number: 6,042,872
[45] Date of Patent: Mar. 28, 2000

[54] PURIFIED HEAT-COAGULATED POTATO PROTEIN FOR USE IN ANIMAL FEED

[75] Inventors: Carla Kemme-Kroonsberg, Beetsterzwaag; Ernst Jannes Fredrik van Uffelen, Veendam; Johannes Cornelis Jacobus Verhaart, Meeden, all of Netherlands

[73] Assignee: Cooperatieve Verkoop-En Productievereniging Van Aardappelmeel En Derivaten Avebe B.A., Ja Veendam, Netherlands

[21] Appl. No.: 08/983,296

[22] PCT Filed: Jul. 17, 1996

[86] PCT No.: PCT/NL96/00290

§ 371 Date: Mar. 23, 1998

§ 102(e) Date: Mar. 23, 1998

[87] PCT Pub. No.: WO97/03571

PCT Pub. Date: Feb. 6, 1997

[30] Foreign Application Priority Data

Jul. 18, 1995 [NL] Netherlands .......................... 1000835

[51] Int. Cl.⁷ ....................................................... A23J 1/00
[52] U.S. Cl. ............................................. 426/656; 426/54
[58] Field of Search ........................................ 426/656, 54

[56] References Cited

FOREIGN PATENT DOCUMENTS

2500200A1  7/1975  Germany .
2814922 A1  10/1979  Germany .
2947207 A1  6/1981  Germany .

OTHER PUBLICATIONS

Knorr, Journal of Food Tech; vol. 12, p. 563–580, 1977.

Knorr et al., "Potato Protein Concentrates: The Influence of Various Methods of Recovery Upon Yield, Compositional and Functional Characterists", *Journal of Food Processing and Preservation,* vol. I:235–247 (1977).

*Primary Examiner*—Chhaya D. Sayala
*Attorney, Agent, or Firm*—Hoffmann & Baron, LLP

[57] ABSTRACT

The invention relates to a method for preparing purified heat-coagulated potato protein, wherein heat-coagulated potato protein, after being separated from potato juice, is treated with one or more aqueous solutions of one or more inorganic acids, and thereafter is recovered. The treatment is preferably carried out at a pH between 1 and 5. The invention further relates to animal feed compositions which contain a prepared purified heat-coagulated potato protein as a component.

9 Claims, 7 Drawing Sheets

6,042,872

PURIFIED HEAT-COAGULATED POTATO PROTEIN FOR USE IN ANIMAL FEED

The invention relates to a method for preparing potato protein products suitable for incorporation as a protein component in animal feed compositions.

BACKGROUND OF THE INVENTION

Animal feed compositions can contain a variety of components, such as carbohydrates (sugars, starch products), fats (animal and/or vegetable fats), protein products, amino acids, vitamins and minerals. Various protein products are used in animal feed compositions, such as soya protein products, lactoproteins, maize gluten, wheat proteins, alpha-protein products, fish proteins and potato protein. Animal feed compositions are used as feed for calves, piglets, poultry, furred animals (minks, foxes), dogs and cats (pet foods) and fish (trout, carp, eel).

Potato protein is obtained as a by-product in the recovery of potato starch from potatoes. In the potato starch manufacture, using mechanical separation techniques, the potato is processed into potato starch, potato pulp and potato juice (also referred to as potato liquor). In the potato juice, the potato protein molecules are present in dissolved condition. There are various possibilities of isolating the potato protein from the potato juice in a more or less pure state. Usually, the potato juice is subjected to a heat treatment, as a result of which the potato protein molecules start to coagulate. This method is designated as heat coagulation or thermal coagulation. The thus-coagulated flocculent potato protein material can be separated from the liquid phase by means of filters, separators or decanters, yielding a separated wet potato protein product in the form of a wet cake. This product still contains 40–80% by weight of moisture and can subsequently be dried to 5–15% by weight of moisture. Calculated on a dry substance basis, heat-coagulated potato protein products contain about 70–90% by weight of protein (calculated as N×6.25), about 3–10% by weight of lipides, about 2–4% by weight of carbohydrates and 1–3% by weight of inorganic components.

Potato protein products have been used as a component in animal feeds over the past 50 years. For this application, potato protein has favourable properties in comparison with other vegetable protein products. The biological value of potato protein is particularly high because of the superior and balanced amino acid composition.

The separated wet heat-coagulated potato protein and the dried product obtained therefrom contain, in addition to the above-mentioned nutrients (proteins, fats, carbohydrates), contaminations in the form of sulphite, glyco-alkaloids, water-insoluble polymers of the melamine type and flavouring substances. In some cases, these contaminations can present problems in the application of animal feed compositions in which unpurified potato protein products are included as a component.

Glyco-alkaloids consist of carbohydrates which are glycosidically linked to a basic aglycone. In potato protein products, solanine and chaconine are the most important glyco-alkaloids. The total amount of glyco-alkaloids (TGA) in heat-coagulated unpurified potato protein products can vary between 500 and 5000 mg/kg (based on dry substance). It is known that glyco-alkaloids can give rise to poisoning symptoms upon consumption by humans or animals. Solanine possesses a direct toxicity due to its choline-esterase inhibiting action in the central nervous system. In addition, solanine has a bitter taste and gives a burning sensation upon consumption. If the glyco-alkaloid content in animal feeds is too high, undesired phenomena can occur, such as feed refusal and retardation of growth.

The water-insoluble polymers of the melamine type impart a grey to green colour to unpurified potato protein products. These polymers are formed by polymerisation (via a chinone stage) of phenol compounds (tyrosine, dihydroxyphenols such as in particular dihydroxyphenyl alanine, caffeic acid and chlorogenic acid) under the influence of enzymes present in the potato juice.

Undesired aromatic and flavouring substances in animal feeds have as a consequence that the animal feed is less well accepted by the animals in question.

If the above-mentioned contaminations are present in too high concentrations in animal feeds, problems can arise, such as a limited acceptance of the feed by the animals and retardation of growth. Owing to the presence of these contaminants, unpurified potato protein products in certain cases can be incorporated in animal feed compositions in limited amounts only. This applies in particular where young animals such as calves and piglets, and dogs are concerned.

The object of the invention is to provide a simple and inexpensive method for preparing purified heat-coagulated potato protein which is suitable for use in animal feed compositions.

Another object of the invention is to provide animal feed compositions in which purified heat-coagulated potato protein is present as a component. The above-mentioned problems that can arise in the application of unpurified potato protein are now solved entirely or largely. The animal feed compositions according to the invention can contain higher percentages of potato protein than if unpurified potato protein is used as a component.

In German Auslegeschrift 2,500,200 (column 8) the removal of solanine from heat-coagulated potato protein is described. The heat-coagulated potato protein (in the form of the wet flock or as a dried product) is treated (extracted) with an aqueous solution of acetic acid or citric acid or treated with an organic solvent (see Example (Beispiel) 3 and Tables (Tabelle) I and II). Through these treatments the solanine content of heat-coagulated potato protein is greatly reduced (see Tabelle I and II). It appears from Example 3a that the inorganic acid HCl gives much poorer results (no reduction of the solanine content) than acetic acid and citric acid when the treatment is carried out on coagulated potato protein which has not been separated from the potato juice in which the coagulation has occurred. The extracted potato protein products according to German Auslegeschrift 2,500,200 are applicable as a component in animal feeds and in foods for humans (see column 9).

The purification of separated heat-coagulated potato protein according to German Auslegeschrift 2,500,200 has as a drawback that the extracting agents used, acetic acid, citric acid or organic solvents are relatively expensive. The relatively high price of acetic acid and citric acid is also mentioned explicitly in German Auslegeschrift 2,500,200 (column 8, lines 1–12).

SUMMARY OF INVENTION

The invention relates to a method for preparing purified heat-coagulated potato protein, wherein heat-coagulated potato protein is first separated from the potato juice and only then is treated with one or more aqueous solutions of one or more inorganic acids, whereafter the treated product is recovered.

The invention further relates to animal feed compositions in which, as a component, purified heat-coagulated potato protein is present which has been obtained according to the method just described.

DETAILED DESCRIPTION OF INVENTION

Figure 1:
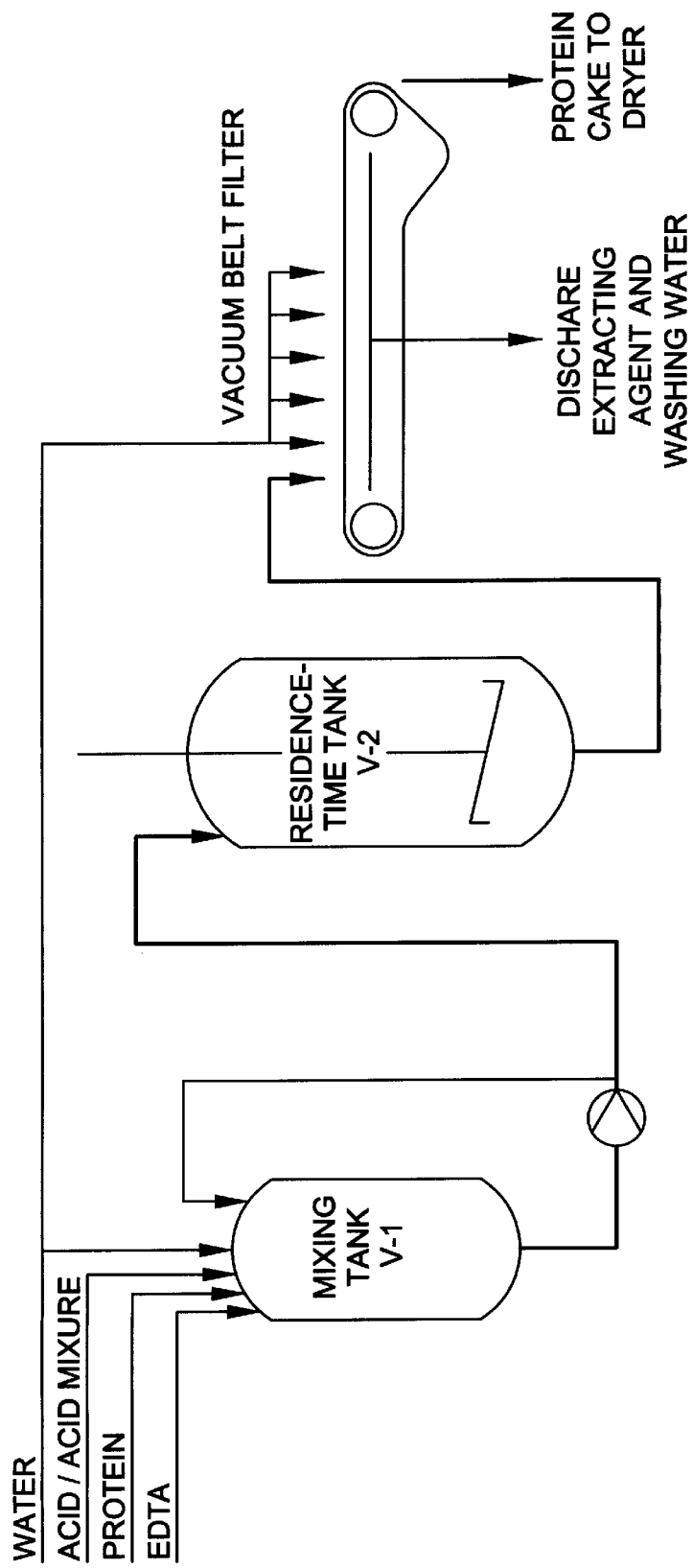
FIG. 1 illustrates the method of the present invention in a diagram.

According to German Auslegeschrift 2,500,200, mild organic acids are used for the purification (reduction of the solanine content) of heat-coagulated potato protein. The use of strong inorganic acids seems less desired because of the danger of hydrolysis and dissolution of the protein molecules. Surprisingly, it has now been found that also inorganic acids, such as phosphoric acid, nitric acid, hydrochloric acid, sulphuric acid or combinations of these acids, are suitable for the purification (by washing/extraction) of heat-coagulated potato protein, without the occurrence of an undesirable extent of hydrolysis and/or dissolution of the potato protein molecules, provided the heat-coagulated potato protein has first been separated from the potato juice. The use of inorganic acids is less costly than the use of organic acids.

In the heat-treatment of potato juice, the potato protein molecules coagulate to form a flocculent coagulum. This coagulum is separated from the obtained suspension by means of filtration, centrifugation or decanting. This yields a wet cake with a dry substance content of 20–60% by weight. This potato protein product separated from the potato juice can be used as a starting material for the purification (by washing/extraction) using aqueous solutions of inorganic acids according to the invention. It is also possible, however, to dry the wet cake first, for instance to 5–15% by weight of moisture. The dried potato protein obtained can then be purified by treatment (washing/extraction) with aqueous solutions of inorganic acids according to the invention. According to the invention, it is also possible to treat both the separated wet potato protein flock and the dried potato protein product obtained therefrom, with one or more aqueous solutions of one or more inorganic acids. After the purification has progressed to the desired extent, the purified potato protein is recovered by separating it from the liquid phase, washing it with water and optionally drying it as well.

The potato protein products to be incorporated in animal feeds in accordance with the invention are obtained by treatment of potato juice-separated heat-coagulated potato protein or the dried product obtained therefrom, with one or more aqueous solutions of one or more inorganic acids. Preferably used as inorganic acid are phosphoric acid, nitric acid, hydrochloric acid, sulphuric acid or combinations of these acids.

The extraction conditions can vary within wide limits and are dependent inter alia on the starting material (extent of contamination, moisture content), the inorganic acid chosen, and the extent to which the purification is to be carried through.

Preferably, the purification occurs in an aqueous medium with a pH between 1 and 5, in particular between 2 and 4 and most preferably between 3 and 4. The contact time of the treatment of the potato protein with the aqueous solution of the inorganic acid is preferably between 10 minutes and 10 hours. The treatment temperature is preferably between 10 and 100° C. The extraction treatment can be carried out continuously or discontinuously. After the purification of the potato protein product has progressed to a sufficient extent, the purified potato protein is first separated from the liquid medium by means of a solids-liquid separation and washed with water. The obtained wet potato protein material can subsequently be dried and, if desired, be ground to the desired particle size. The potato protein product obtained has a total glyco-alkaloid (TGA) content which is preferably below 500 mg/kg and preferably below 250 mg/kg (calculated on dry substance). The product has an improved taste, odour and colour.

The animal feed compositions according to the invention contain the purified potato protein products as described hereinbefore. Through the purification using inorganic acids, potato protein products are obtained which, as a component in animal feeds, possess improved properties with regard to digestibility, odour, taste and acceptance, in comparison with unpurified potato protein products. As a result, in comparison with unpurified potato protein products, the purified potato protein products can be included in larger amounts in various animal feed compositions. The amount of purified potato protein which can be included in animal feed compositions is dependent inter alia on the animal species and the other components of the animal feeds. As other components, the following can be mentioned: carbohydrates, fats, animal proteins, other vegetable proteins, minerals, vitamins, antioxidants, antibiotics, amino acids, and emulsifiers. The purified potato protein products to be included in animal feed compositions in accordance with the invention can be mixed with the other components in the conventional equipment for this purpose.

The animal feed compositions according to the invention can be intended for various animal species, such as piglets, calves, poultry, dogs, cats, furred animals (minks and foxes) and fish (trout, carp, eel). These animal feed compositions are especially particularly suitable for young animals such as piglets and calves and for dogs (SW 53).

Hereinbelow, the invention is further elucidated in and by a number of examples.

EXAMPLE 1

(acid extraction on a laboratory scale)

Of dried potato protein, obtained by thermal coagulation, with a TGA content of 2500 ppm, a 3 wt.% suspension in tap water is prepared. Under stirring, the suspension is adjusted to pH 3–3.5 with an inorganic acid or with a mixture of inorganic acids (nitric acid, phosphoric acid, hydrochloric acid, sulphuric acid). Five and fifteen minutes after acidification of the suspension, the pH is re-adjusted to 3–3.5. In total, the suspension is stirred For half an hour or longer.

Then the suspension is dehydrated on a Buchner funnel. The protein cake is washed with the same amount of water as the amount of suspension.

Optionally, prior to the acidification, EDTA (about 0.7 g/kg protein) is added to the suspension to reduce the iron content of the purified protein.

Dehydration of the protein suspension can also be carried out with a centrifuge. After decanting of the supernatant, the protein pellet is stirred in washing water—the amount of washing water is equal to the amount of suspension—and the suspension is again dehydrated in the centrifuge.

The TGA contents achieved are generally below 100 ppm (measured according to the calorimetric method).

EXAMPLE 2
(acid extraction through vacuum belt filters)

This method is diagrammatically represented in FIG. 1 of the drawings.

Dried potato protein which has been obtained according to the normal Avebe procedure through thermal coagulation (TGA content 2500 ppm) is suspended with water. To the suspension, EDTA (about 0.7 kg/ton protein) is added to reduce the iron content of the protein purified through extraction with inorganic acid. The suspension is adjusted to pH 2.5–3.0 with an inorganic acid or with a combination of inorganic acids. The suspension is intensively mixed in a mixing tank (V-1). The residence time in this tank is a few minutes.

From the mixing tank (V-1) the suspension is pumped into a residence-time tank (V-2). The residence time in this tank is at least half an hour.

Through the reaction in the residence-time tank, the pH increases by a few 0.1 pH units. The pH is adjusted in the mixing tank (V-1) in a manner such that the pH in the residence-time tank becomes 3 to 3.5. Depending on the TGA content of the extracted protein, the pH of the residence-time tank is adjusted. If the TGA content is too high, the pH is lowered.

The dry substance content of the suspension in the residence-time tank (V-2) is 2–3% by weight. The dry substance content of the suspension is adjusted on the basis of the TGA content of the extracted potato protein. If the TGA content is too high, the dry substance content of the suspension is reduced.

The temperature of the suspension is determined by the temperature of the process water (15–30° C.). From the residence-time tank (V-2), the suspension is pumped to a vacuum belt filter. On this filter the suspension is dehydrated by drawing the extraction liquid through the filter cloth by means of vacuum. The dehydrated protein cake is transported with the moving filter cloth to the right over the vacuum belt filter. During this transport, the protein cake is intensively washed with process water. The washing water is continually drawn through the filter cloth as a result of the vacuum. The amount of washing water is equal to the amount of suspension that is pumped onto the filter.

The protein cake leaves the vacuum belt filter with a dry substance content of about 30% by weight. The protein cake is dried in a pneumatic dryer.

For the acid, different acids and combinations thereof were used: phosphoric acid; nitric acid (85%; 30–80 l/ton); nitric acid and hydrochloric acid; nitric acid and hydrochloric acid and sulphuric acid.

The use of EDTA is not necessary for the removal of the TGA. For this purpose, EDTA can be omitted without problems.

The acid-extracted protein has a TGA content of <110 ppm (calorimetric assay); the protein content is increased by a few per cent to about 88–90%; through the extraction and the intensive washing, the ash content has been reduced; the reflection factor (=colour) has improved.

EXAMPLE 3
(acid extraction using decanters)

Figure 2:
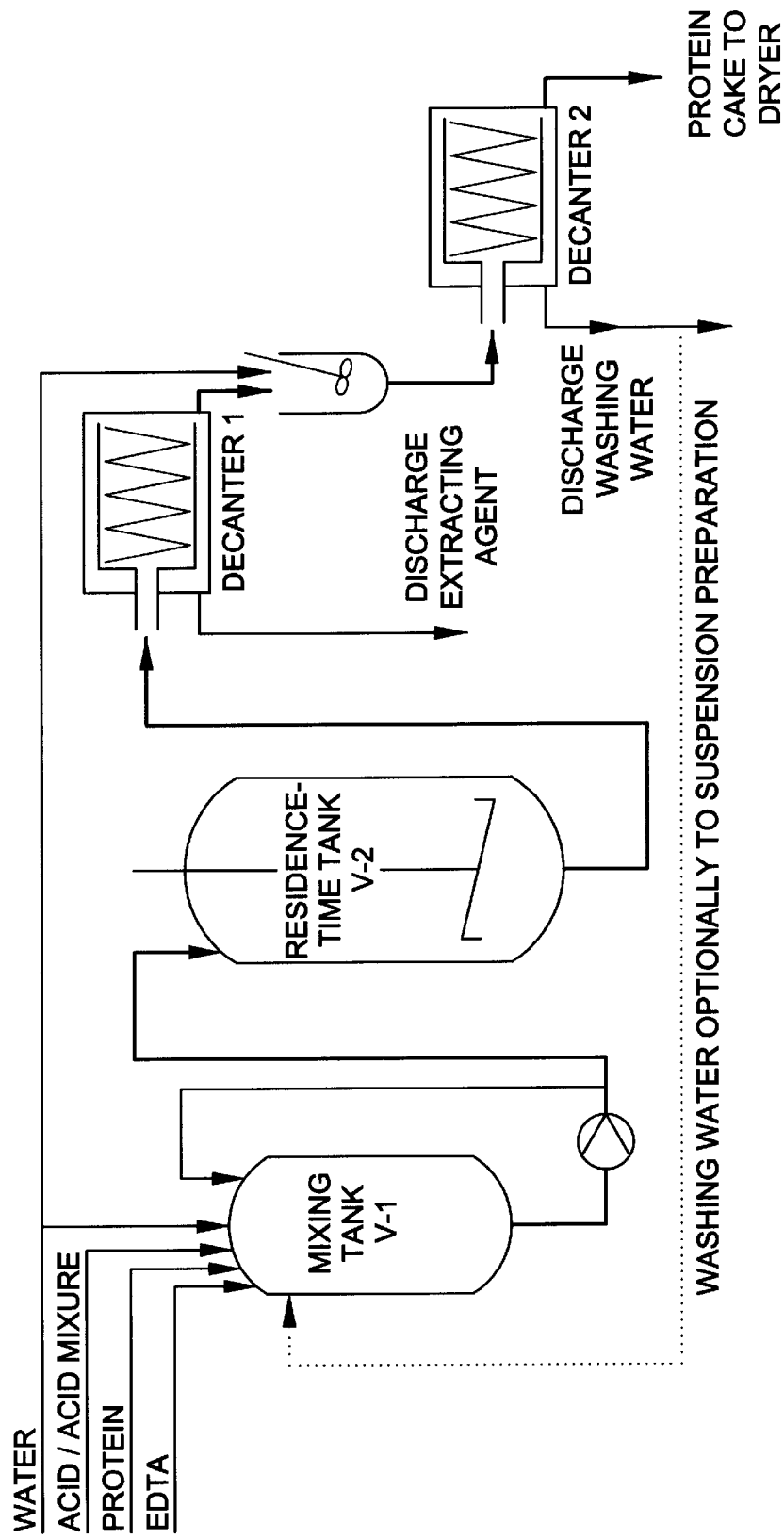
FIG. 2 also illustrates the method of the present invention in a diagram.

This method is diagrammatically represented in FIG. 2 or the drawings.

The suspension is prepared and treated similarly to that in Example 2. Unlike in Example 2, the suspension is not dehydrated with a vacuum belt filter but with decanters. The protein cake of decanter 1 is resuspended with water. This suspension is dehydrated with decanter 2. The protein cake is dried with a Pneumatic dryer.

The overflow of decanter 2 can also be used to prepare the initial protein suspension.

The suspension in these cases was acidified with nitric acid (85%;; 30–80 l/ton). The TGA contents of the potato proteins used, which had been recovered by thermal coagulation, were 3,000 and 4,000 ppm, respectively (measured with HPLC). The TGA contents of the extracted proteins were 240 and 450 ppm, respectively.

EXAMPLE 4
(artificial milk powder)

In a comparative growth test with 60 bull calves, the effect was investigated of thermally coagulated potato protein purified according to the invention, compared with untreated thermally coagulated potato protein (reference potato protein), and skim milk powder, on the growth of fattening calves.

Upon arrival, the animals were fed during a pre-period with a commercial starting feed. After the pre-period, the animals were divided into three uniform groups according to their growth, type (breed), and Hb (haemoglobin content). Three artificial milk rations (FEEDs 1 through 3) were each assigned at random to one group. The commercial reference (FEED 1) comprised an artificial milk powder with crude protein (N-Kjeldahl×6.25) 18%; crude fat 21%; lactose 45%; starch 2%; ash 7%; ME (metabolisable energy) calf 4400 Kcal. Important ingredients were potato protein (0,63%), skim milk powder (25.5%), whey powders (total 50%) and fat core (19%). For the artificial milk powders with reference potato protein (FEED 2) and potato protein purified according to the invention (FEED 3), the composition is given in Table 1. In these artificial milk powders no skim milk powder was included. The age of the animals was about 6 weeks at the start of the main period. Emulsions of the three artificial milk powders were fed over a main period of 20 weeks according to a practical feeding schedule. The animals were weighed at the start of the main period and subsequently every two weeks.

TABLE 1

| ingredients (%) | FEED 2/FEED 3 |
|---|---|
| whey powder sweet | 33.8 |
| whey powder delactosed | 25.6 |
| whey powder/fat | 1.1 |
| potato protein* | 7.5 |
| fat core | 21.2 |
| wheat flour/starch | 8.5 |
| dicalcium phosphate | 0.11 |
| CaCO$_3$ | 0.5 |
| L-lysine | 0.55 |
| L-methionine | 0.25 |
| premix (vitamins/minerals) | 1.0 |
| calculated contents (%): | |
| crude protein | 19 |
| crude fat | 21 |
| lactose | 38 |
| starch | 7 |
| ash | 7 |
| ME | 4400 Kcal |

*FEED 2: reference potato protein with a protein content (N × 6.25) >83.5%; a moisture content of 10%; and a TGA content of 2,500 ppm
FEED 3: potato protein purified according to the invention, with a protein content (N × 6.25) >86.5%; a moisture content of <11%; and a TGA content of <110 ppm.

Figure 3:
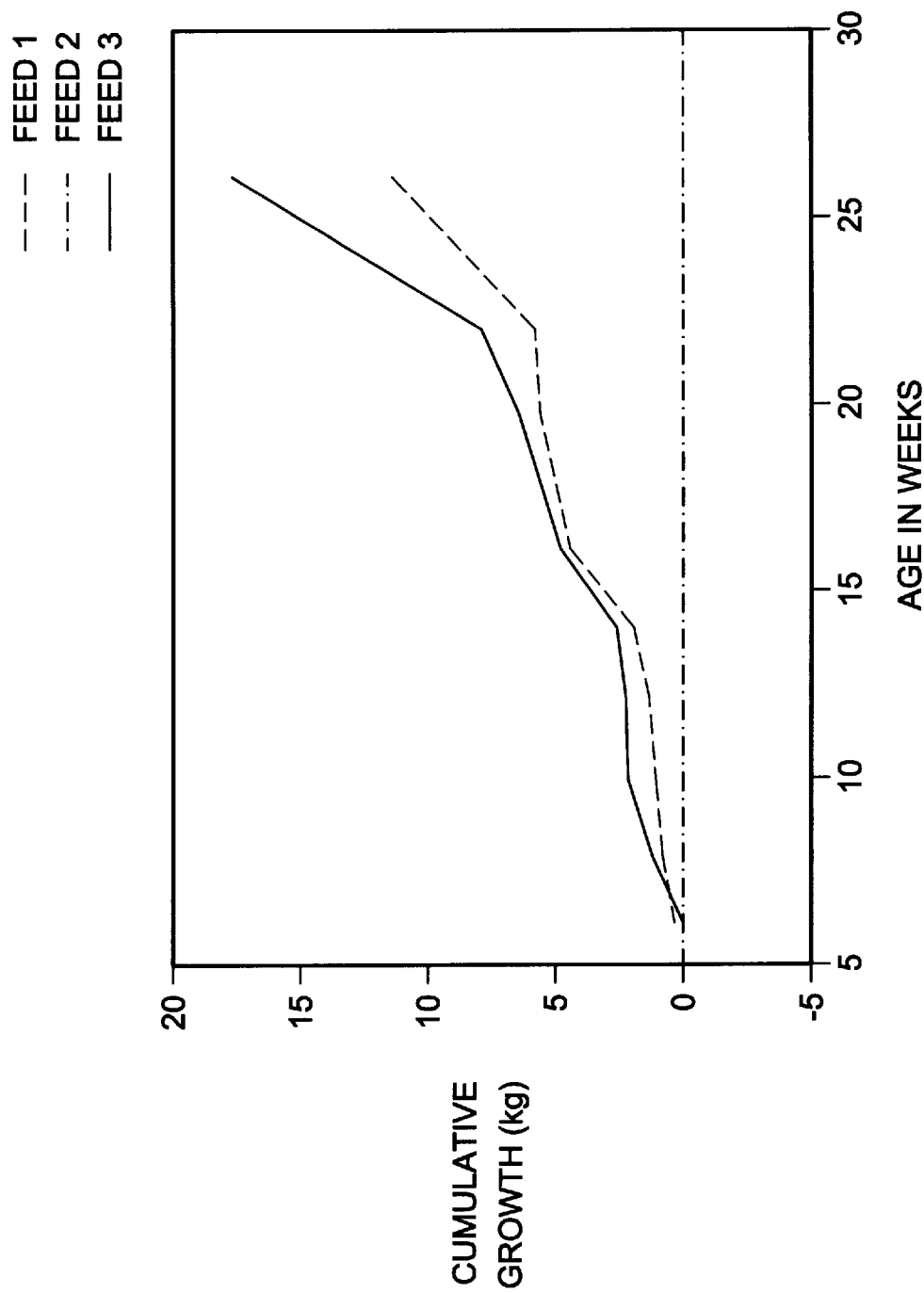
FIG. 3 depicts the average cumulative growth of calves fed with Feeds 1 through 3.

The average cumulative growth of the fattening calves fed with FEEDs 1 through 3 is represented in FIG. 3 of the drawings.

From FIG. 3 it can be derived that the animals fed with artificial milk powder in which potato protein purified according to the invention has been incorporated, exhibit, after 20 weeks of main period (age 26 weeks), a higher cumulative growth than animals fed with reference potato protein. The cumulative growth of the group of calves fed with FEED 3 is even higher, as of an age of 22 weeks, than that of the group fed with the commercial reference. Compared with unpurified potato protein, the use of potato protein purified according to the invention in artificial milk powders gives an improved growth of fattening calves fed with these artificial milk powders.

EXAMPLE 5

(piglet feed for weaner piglets)

In a comparative feed test with about 180 newly weaned piglets of about 3 weeks, the effect was investigated of heat-coagulated potato protein purified according to the invention, compared with untreated heat-coagulated potato protein (reference potato protein), on the feed intake, growth and feed conversion.

Upon arrival, the animals were divided into blocks according to their weight and gender, and one of the test feeds was assigned at random. There were about 10 piglets per pen and 6 pens per feed. The animals were given a commercial feed during a pre-period of about 1 week. Water was available at will. During a main period of 3 weeks. the animals were given the test feeds (FEEDs 4 through 6) at will. The compositions of the feeds are listed in Table 2. The weight of the animals was measured at the start of the test and subsequently every week, along with the feed intake. The feed conversion was calculated as kg growth per kg feed.

TABLE 2

| ingredients (%) | FEED 4/FEED 5 | FEED 6 |
| --- | --- | --- |
| maize | 51.7 | 56.1 |
| extracted soyameal | 26.4 | 17.7 |
| potato protein* | 4.2 | 8.3 |
| whey powder | 10.0 | 10.0 |
| soya oil | 3.0 | 3.0 |
| monocalcium phosphate | 1.94 | 2.14 |
| CaCO3 | 0.8 | 0.8 |
| NaCl | 0.25 | 0.25 |
| premix (vitamins/minerals) | 1.7 | 1.7 |
| DL-methionine | 0.009 | — |
| calculated contents (%): | | |
| crude protein | 21 | 21 |
| intestine-digestible | | |
| lys | 1.05 | 1.05 |
| met + cyss | 0.60 | 0.61 |
| thr | 0.72 | 0.78 |
| trp | 0.21 | 0.20 |
| Ca | 0.9 | 0.9 |
| P-total | 0.8 | 0.8 |

*FEED 4: reference potato protein as specified in Example 4
FEED 5 and FEED 6: potato protein purified according to the invention, as specified in Example 4

Figure 4:
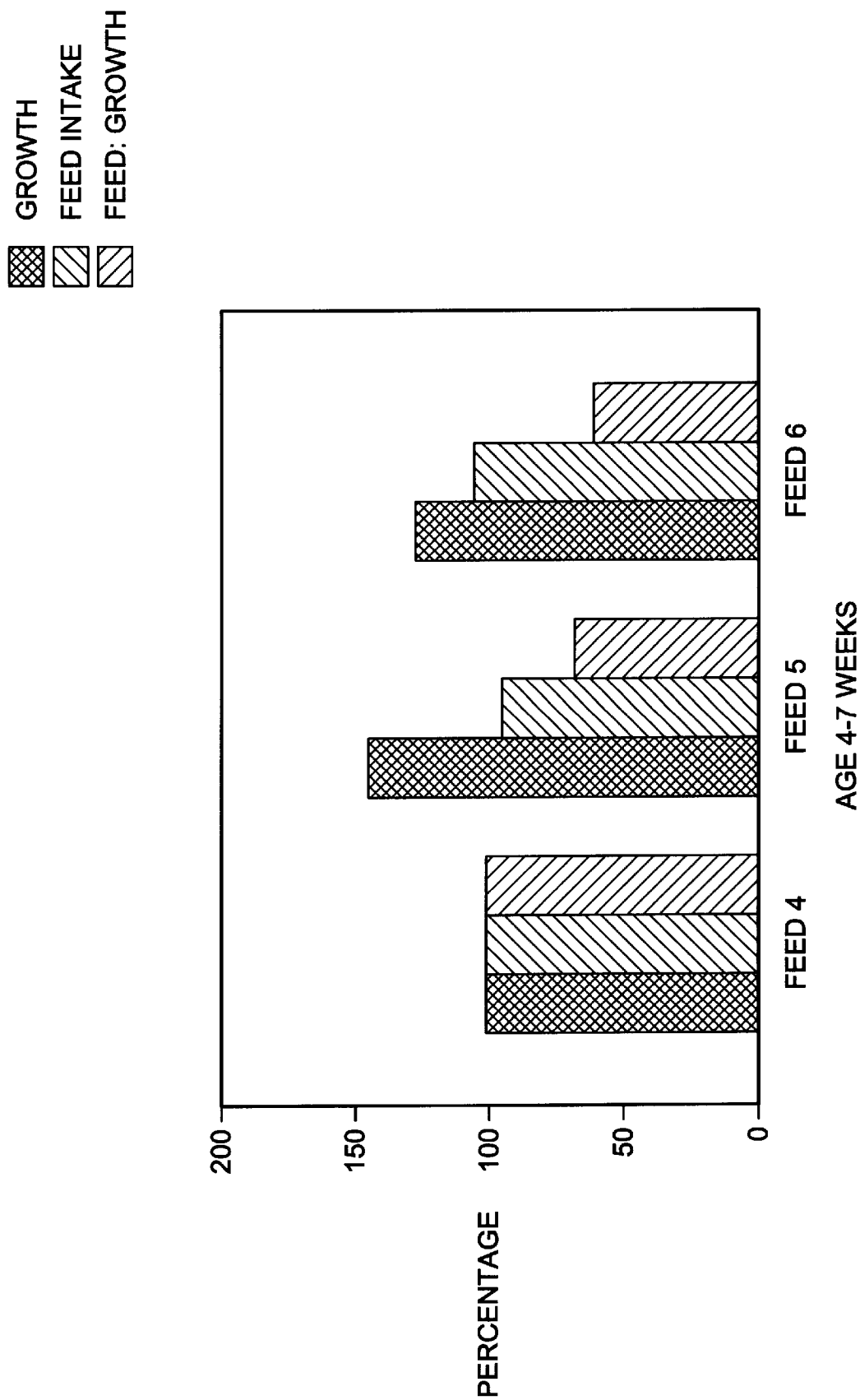
FIG. 4 illustrates the average cumulative growth of piglets fed with Feeds 4 through 6.
Figure 5:
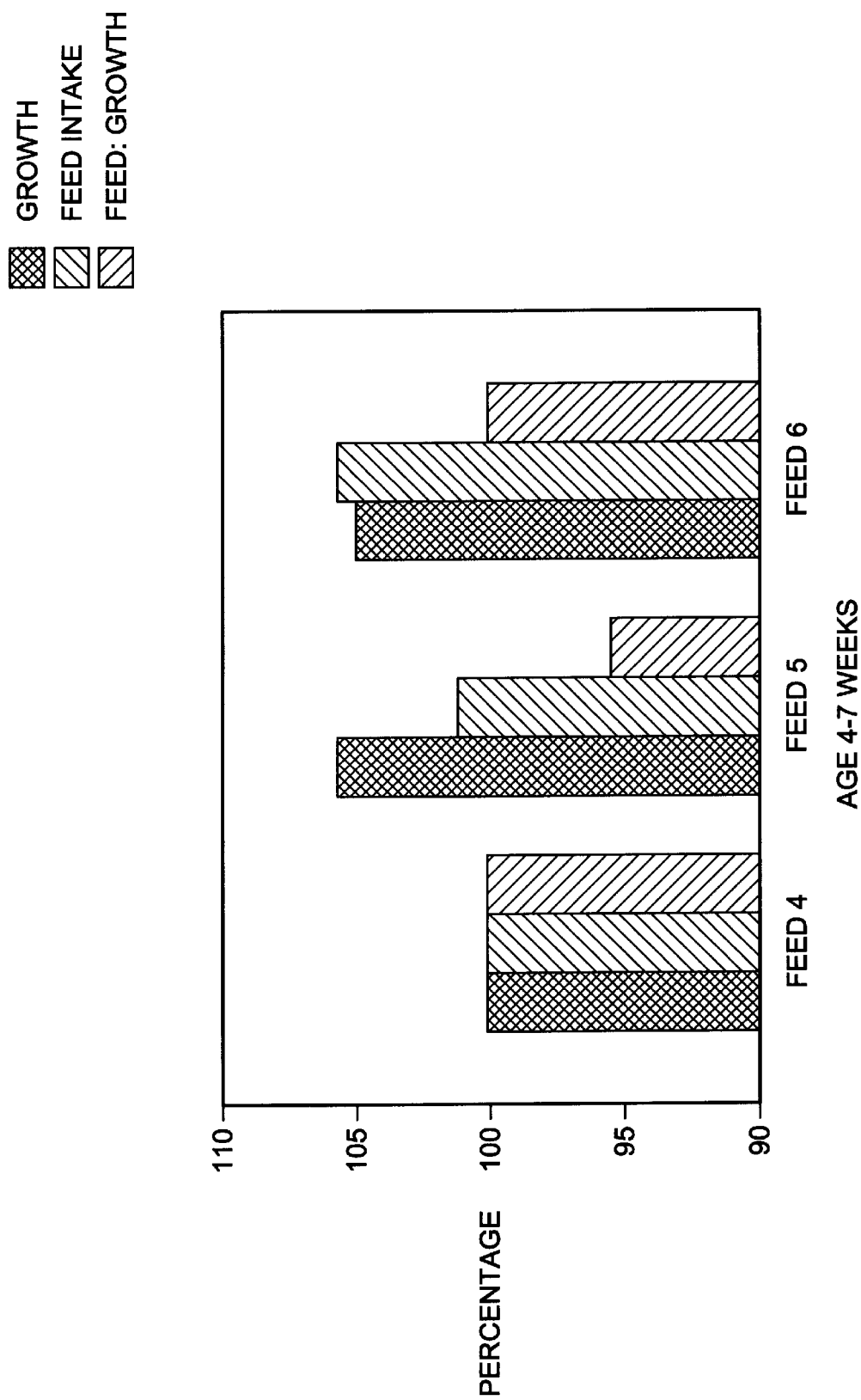
FIG. 5 illustrates the average cumulative growth of piglets fed with Feeds 4 through 6.

The results regarding average growth, feed intake and feed conversion of weaner piglets in the period of 4–5 weeks of age and 4–7 weeks of age, respectively, fed with FEED 5 and FEED 6 in % against FEED 4 (100%), are shown in FIGS. 4 and 5 of the drawings.

Piglets fed with FEED 5 and FEED 6 (containing, respectively, 4.2% and 8.3% of potato protein purified according to the invention) exhibit in the first week a clearly better growth than the animals fed with reference potato protein (FEED 4) (FIG. 4). This picture is confirmed at the end of the test period (FIG. 5). Given an equal feed intake (FEED 5) or even a slightly better feed intake (FEED 6), this results in a lower, hence better and equal feed conversion, respectively, for the feeds with potato protein purified according to the invention.

From the literature and practice it is known that (reference) potato protein in percentages higher than 5% adversely affects the feed intake. From the results presently obtained, however, it appears clearly that a doubling of the percentage of purified potato protein has no adverse consequences for the feed intake. In the overall test period, the feed with the high percentage of purified potato protein (FEED 6, 8%) is taken in even better than the other feeds. Compared with unpurified potato protein, potato protein purified according to the invention, when used in piglet feeds, gives an improvement of the feed intake and growth of piglets fed with these feeds. This results in a good start for the growth phase towards a fattening pig fit for slaughter.

EXAMPLE 6

(dog food)

To investigate the effect of heat-coagulated potato protein Durified according to the invention and untreated heat-coagulated potato protein (reference potato protein) on the preference for food and the food intake of grown dogs, two double-feeder preference tests were carried out with 10 grown dogs of different breeds: spaniel, dachshund, beagle and pug-dog. In test 1 the control feed was compared with the feed with reference potato protein and in test 2 with the feed with potato protein purified according to the invention. On 5 consecutive days the dogs were given 20-minute access to two feeders with control feed and test feed, respectively. The positions of the feeders were changed daily. The compositions of the control feed (FEED 7 and FEED 9) and the test feeds (FEED 8 and FEED 10) are listed in Table 3.

TABLE 3

| ingredients (%) | FEED 7/FEED 9 | FEED 8/10 |
| --- | --- | --- |
| maize | 52.7 | 56.9 |
| meat bone meal | 18.25 | 20.70 |
| extracted soyameal | 9.5 | — |
| maize gluten feed | 5.0 | 5.0 |
| poultry offal meal | 2.5 | — |
| potato protein* | — | 5.0 |
| yeast extract | 0.5 | 0.5 |
| soya hulls/beetroot pulp | 5.0 | 5.0 |
| fat | 3.20 | 3.55 |
| premix (vitamins/minerals) | 2.85 | 2.85 |
| NaCl | 0.5 | 0.5 |
| calculated contents (%): | | |
| crude protein | 21 | 21 |
| crude fat | 8 | 8 |
| crude fiber | 4 | 4 |
| Ca | 1.98 | 1.94 |
| P | 1.18 | 1.11 |
| lys | 1.01 | 1.03 |
| met + cyss | 0.63 | 0.67 |
| ME | 3013 Kcal | 3025 Kcal |

*FEED 8: reference potato protein as specified in Example 4
FEED 10: potato protein purified according to the invention, as specified in Example 4

The data were analysed after arc-sin transformation of the daily feed intake. A high preference means that the feed intake is high in absolute terms as well. The results of the two tests are summarized in FIG. 6.

Figure 6:
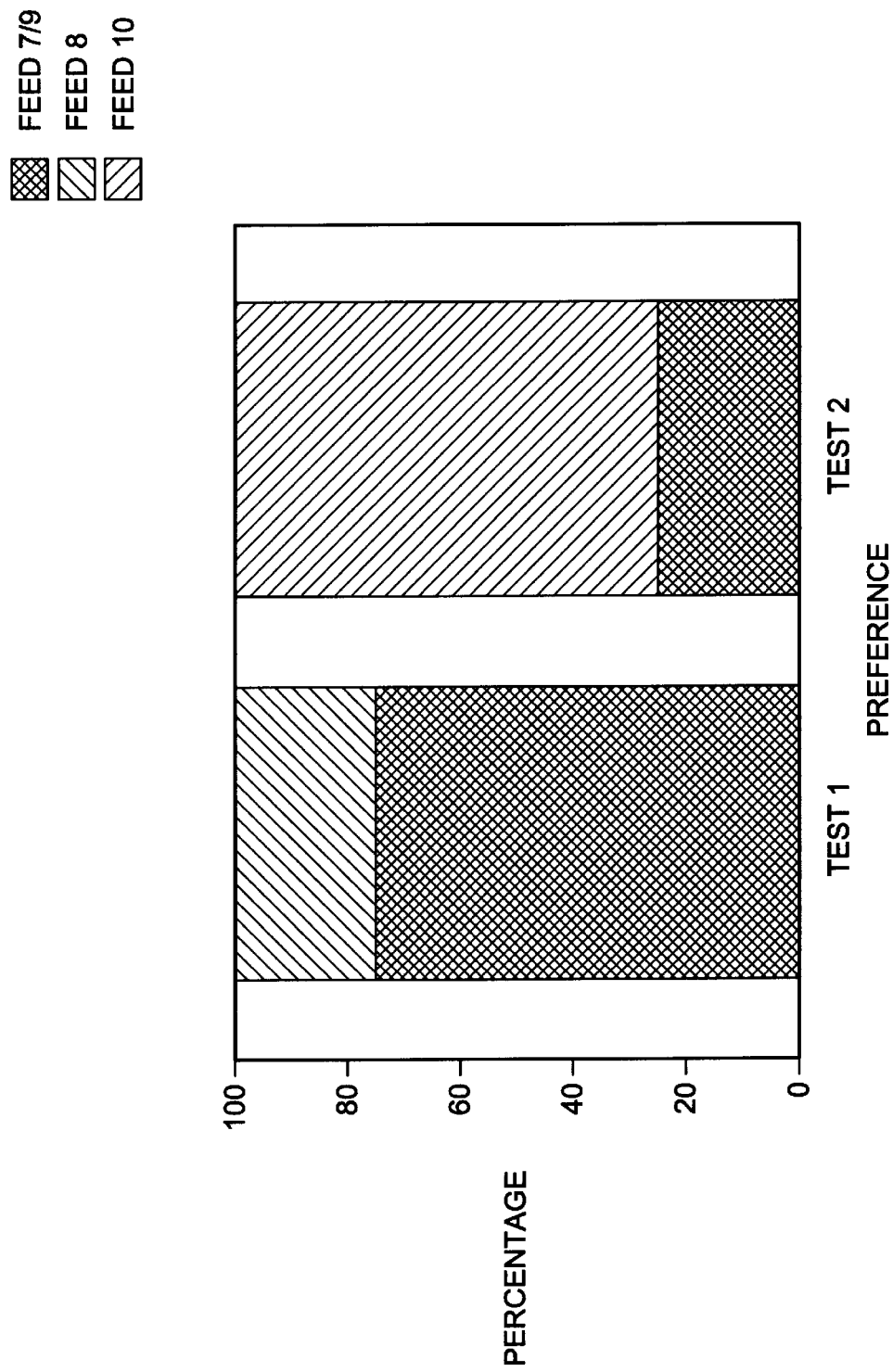
FIG. 6 illustrates the results of average growth of feed intake of dogs fed with Feed 7/9, Feed 8, and Feed 10.

FIG. 6, test 1, shows a clear preference of the dogs for the control feed (FEED 7) at the expense of the feed with reference potato protein (FEED 8). The result of test 2 shows an ample preference on the part of the dogs for the food with potato protein purified according to the invention (FEED 10), at the expense of FEED 9. It appears from these tests that the potato protein purified according to the invention, compared with unpurified potato protein, has a strongly improved tastiness.

EXAMPLE 7
(piglet rearing feed for suckling piglets)

In a test with 190 suckling piglets at an age of 12 to 26 days, the effect was investigated of heat-coagulated potato protein purified according to the invention, compared with untreated heat-coagulated potato protein (reference potato protein), on feed intake and growth. Twenty litters of an age of about 11 days were divided into two equal groups based on parity of the sow, litter size and sex distribution within the litter. The animals were housed in farrowing pens. One day after allocation, the piglets for the first time were given solid feed in the form of the test feed. For this purpose, two rearing feeds were composed. The compositions of the feeds are listed in Table 4. The sows were fed three times a day and water was available to them at will. The weight of the piglets was measured upon allocation and upon weaning (26 days of age). The feed intake was recorded per litter for the period referred to (12 to 26 days of age).

TABLE 4

| ingredients (%) | FEED 11 | FEED 12 |
| --- | --- | --- |
| maize | 21 | 22 |
| barley | 10 | 10 |
| potato protein* | 7.5 | 6.9 |
| soya concentrate | 12.7 | 12.6 |
| skim milk powder | 7 | 7 |
| whey powder | 25 | 25 |
| sugar | 7 | 7 |
| soya oil | 4.40 | 4.15 |
| premix (vitamins/minerals) | 1.0 | 1.0 |
| $CaCO_3$ | 1.03 | 1.03 |
| monocalcium phosphate | 1.6 | 1.6 |
| L-lysine | 0.15 | 0.15 |
| DL-methionine | 0.07 | 0.07 |
| fumaric acid | 1.5 | 1.5 |
| calculated contents (%): | | |
| crude protein | 23 | 23 |
| crude protein from potato protein intestine-digestible | 5.5 | 5.4 |
| lys | 1.65 | 1.56 |
| met + cyss | 0.72 | 0.72 |
| thr | 0.87 | 0.87 |
| trp | 0.23 | 0.23 |
| Ca | 0.96 | 0.96 |
| digestible phosphorus | 0.60 | 0.60 |

*FEED 11: reference potato protein as specified in Example 4
FEED 12: potato protein purified according to the invention, as specified in Example 4

Figure 7:
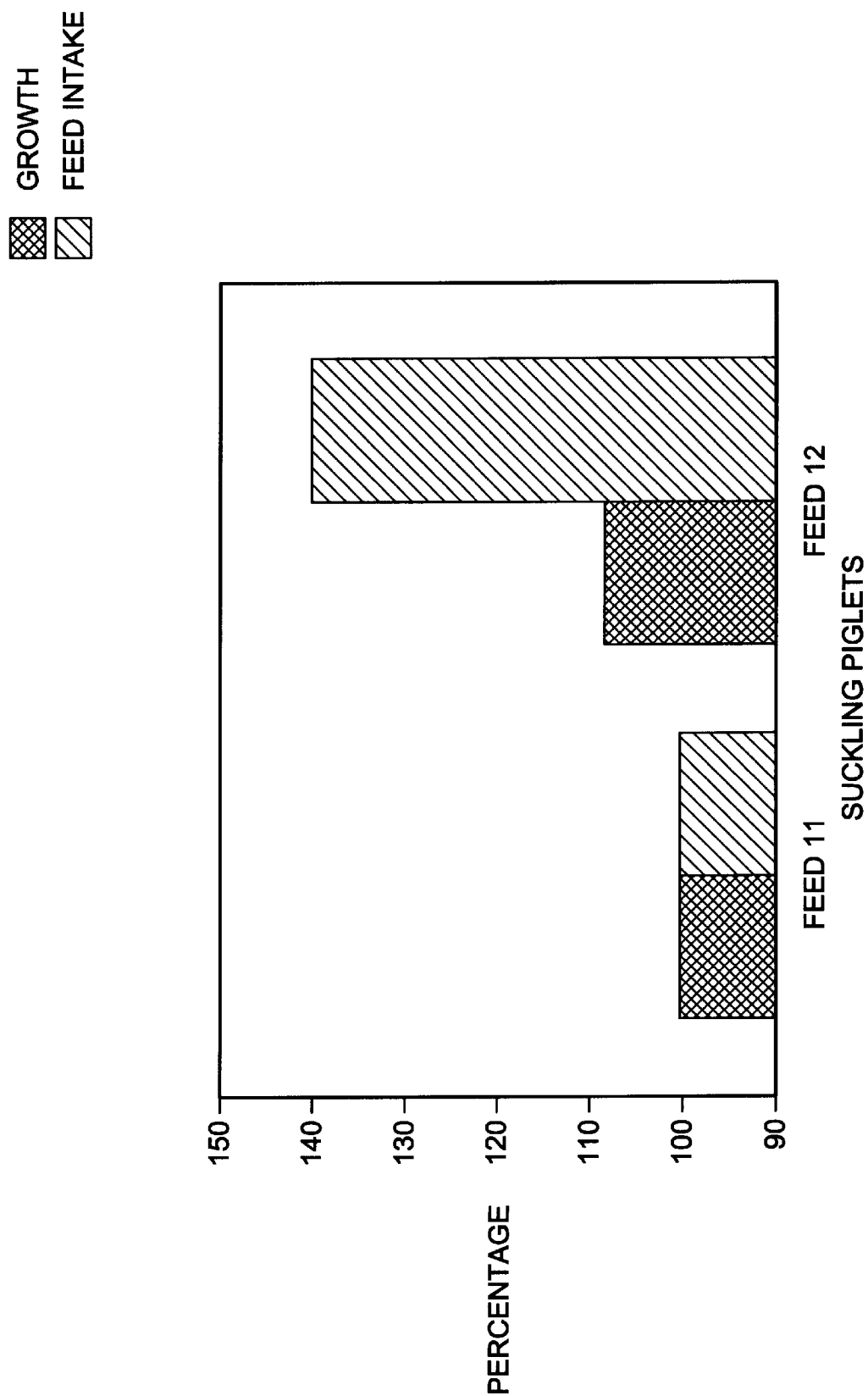
FIG. 7 illustrates the results of average growth of feed intake of piglets fed with Feeds 11 and 12.

In FIG. 7 the feed intake and the growth of suckling piglets fed with purified potato protein expressed as a per cent of the results of the group fed with reference potato protein.

Feed intake of suckling piglets is of great importance for the technical results of the animals as weaner piglet and thereafter as fattening pig. From FIG. 7 it appears that the intake of suckling piglets of feed with purified potato protein was clearly higher than the intake of feed with unpurified potato protein. The use of potato protein purified according to the invention in rearing feeds therefore gives an improvement of the feed intake and a better start for the growth from weaner piglet to fattening pig fit for slaughter.

We claim:

1. A method for preparing purified heat-coagulated potato protein suitable for use in animal feed compositions which consists essentially of the following steps in the order set forth below:

(a) heat coagulating potato protein in potato juice;
   (b) separating said coagulated potato protein from said potato juice,
   (c) treating said coagulate potato protein from step (b) with one or more aqueous solutions of one or more inorganic acids to reduce glycoalkoloid concentration to less than 500 mg/kg; and
   (d) recovering said coagulated potato protein from said aqueous solution.

2. A method according to claim 1, wherein the treatment is carried out at a pH between 1 and 5.

3. A method according to claim 1, wherein the treatment is carried out at a pH between 2 and 4.

4. A method according to claim 1, wherein the treatment is carried out at a pH between 3 and 4.

5. A method according to claim 1, wherein as inorganic acid(s), phosphoric acid, nitric acid, hydrochloric acid, sulphuric acid or combinations of these acids are used.

6. An animal feed composition which contains as a component purified heat-coagulated potato protein which has been prepared according to the method of claim 1.

7. An animal feed composition according to claim 6, which is intended for calves.

8. An animal feed composition according to claim 6, which is intended for piglets.

9. An animal feed composition according to claim 6, which is intended for dogs.

* * * * *